US009061243B2

(12) United States Patent
Nalette et al.

(10) Patent No.: US 9,061,243 B2
(45) Date of Patent: Jun. 23, 2015

(54) CATALYST FOR LIFE SUPPORT SYSTEM

(75) Inventors: Timothy A. Nalette, West Stafford, CT (US); Christopher Eldridge, Manchester, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 1085 days.

(21) Appl. No.: 13/081,026

(22) Filed: Apr. 6, 2011

(65) Prior Publication Data
US 2012/0258013 A1 Oct. 11, 2012

(51) Int. Cl.
| | |
|---|---|
| A62B 7/08 | (2006.01) |
| B01D 53/86 | (2006.01) |
| B01J 37/16 | (2006.01) |
| B01J 21/06 | (2006.01) |
| B01J 23/42 | (2006.01) |
| B01J 35/10 | (2006.01) |
| B01J 37/02 | (2006.01) |
| B01J 37/18 | (2006.01) |

(52) U.S. Cl.
CPC ............ *B01D 53/8668* (2013.01); *B01J 37/16* (2013.01); *B01J 37/18* (2013.01); *B01J 21/063* (2013.01); *B01J 23/42* (2013.01); *B01J 35/1014* (2013.01); *B01J 35/1038* (2013.01); *B01J 37/0201* (2013.01); *B01D 53/864* (2013.01); *B01D 2255/1021* (2013.01); *B01D 2255/20707* (2013.01); *B01D 2257/502* (2013.01); *B01D 2257/708* (2013.01); *B01D 2258/06* (2013.01); *B01D 2259/4508* (2013.01); *B01D 2259/4575* (2013.01)

(58) Field of Classification Search
CPC .... B01J 35/1014; B01J 25/1038; B01J 23/42; B01J 21/063
USPC ........................................................ 422/122
See application file for complete search history.

(56) References Cited

U.S. PATENT DOCUMENTS

| | | | |
|---|---|---|---|
| 4,526,886 | A | 7/1985 | Joy, III |
| 5,091,358 | A | 2/1992 | Birbara et al. |
| 5,174,974 | A | 12/1992 | Birbara et al. |
| 5,460,734 | A | 10/1995 | Birbara et al. |
| 5,859,265 | A | 1/1999 | Muller et al. |
| 6,001,768 | A | 12/1999 | Buysch et al. |
| 6,509,293 | B1 | 1/2003 | Zoeller et al. |
| 6,517,899 | B1 | 2/2003 | Hoke et al. |
| 6,685,900 | B2 | 2/2004 | Domesle et al. |
| 7,727,495 | B2 | 6/2010 | Burd et al. |

(Continued)

FOREIGN PATENT DOCUMENTS

CN 101623635 1/2010

OTHER PUBLICATIONS

Nalette et al., "Advanced Catalysts for the Ambient Temperature Oxidation of Carbon Monoxide and Formaldehyde," American Institute of Aeronautics and Astronautics, Published Jul. 2010, 11 pp.

*Primary Examiner* — Kevin Joyner
(74) *Attorney, Agent, or Firm* — Carlson, Gaskey & Olds, P.C.

(57) ABSTRACT

A catalyst for a life support system includes a plurality of titania support particles that define an average particle surface area. Platinum metal is disposed on the plurality of titania support particles such that a ratio of the average particle surface area to the percentage amount of the platinum metal is between 5 and 50 $m^2/\%$ Pt g.

18 Claims, 1 Drawing Sheet

(56) References Cited

U.S. PATENT DOCUMENTS

| | | |
|---|---|---|
| 2005/0119118 A1 | 6/2005 | Walsh et al. |
| 2005/0129591 A1 | 6/2005 | Wei et al. |
| 2005/0163673 A1* | 7/2005 | Johnson et al. ............... 422/139 |
| 2007/0129247 A1 | 6/2007 | Chigapov et al. |
| 2012/0065443 A1* | 3/2012 | Mabande et al. ............. 585/430 |

* cited by examiner

CATALYST FOR LIFE SUPPORT SYSTEM

BACKGROUND

This disclosure relates to a catalyst that is designed for increased catalytic activity in systems such as life support systems.

Catalysts are generally known and used in a variety of different industries, such as energy processing, air purification, chemical production, biology and even food processing. Typically, the catalyst is designed for the intended end use. For instance, the catalyst is designed to be durable in the use environment and achieve a desired level of catalytic activity with the target reactants. For some end uses, the catalyst is a supported catalyst that includes support particles and a catalytic material that is applied onto the support particles.

SUMMARY

Disclosed is a catalyst for a life support system which includes a plurality of titania support particles that define an average particle surface area. Platinum metal is disposed on the plurality of titania support particles such that a ratio of the average particle surface area to the percentage amount of the platinum metal is between 5 and 50 $m^2$/% Pt g.

The catalyst may be employed in a life support system. An exemplary life support system includes a compartment that encloses an internal environment from an environment outside of the compartment with regard to any gas circulation between the two environments. An air conditioning passage is in fluid communication with the internal environment to receive air therefrom and discharge conditioned air thereto. The catalyst is disposed within the air conditioning passage to condition the air received from the internal environment.

Also disclosed is a method for processing a catalyst for a life support system. The method includes depositing the platinum metal on the plurality of titania support particles with the prescribed ratio between the average particle surface area and the percentage amount of the platinum metal.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
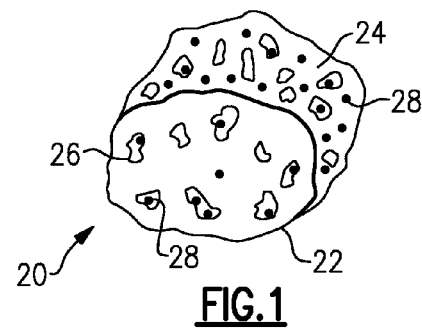
FIG. 1 illustrates an example supported catalyst.

FIG. 1 schematically illustrates an example catalyst 20, which may be used in a life support system as will be described in additional detail below. As shown, the catalyst 20 includes a titania support particle 22. Only one titania support particle 22 is shown, but the catalyst 20 may in fact include a plurality of such particles. In embodiments, the titania material of the titania support particle 22 has the general composition $TiO_2$ and is of the anatase form of titanium dioxide.

Each of the plurality of titania support particles 22 includes a continuous solid phase 24 that forms the body of the titania support particle 22 and pores 26 that extend at least partially through the continuous solid phase 24. The pores 26 may be located substantially at the surface of the titania support particle 22. However, in some embodiments, a portion of the pores 26 may extend into the interior of the titania support particle 22 and form a pore network with other pores 26. This disclosure is not limited to any particular type of pore structure.

The plurality of titania support particles 22 together define an average particle surface area, which can be expressed by the variable SA in the units of square meters per gram ($m^2$/g).

As shown, platinum metal 28 is deposited on the titania support particle 22. The platinum metal 28 may be in the form of platinum particles or agglomerates that are located on peripheral surfaces of the titania support particle 22 and/or on the surfaces of the pores 26. In embodiments, the catalyst 20 is made only of the titania material of the titania support particles 22, the platinum metal 28 and any incidental or accidental impurities.

The platinum metal 28 is present in an amount, % Pt, which is a percentage of a combined weight of the platinum metal 28 and the plurality of titania support particles 22. The % Pt and the SA of the titania support particles 22 are selected to enhance the catalytic activity of the catalyst 20 in a life support system with regard to conditioning air in the life support system to remove target substances, such as carbon monoxide and formaldehyde, from the air. The mechanism of removal involves the adsorption of the target substance and oxygen onto the platinum metal 28. The target substance and adjacent oxygen molecules react to oxidize the target substance, which then desorbs from the platinum metal 28.

In embodiments, the SA of the titania support particles 22 and the % Pt are selected such that a ratio of SA/% Pt is between 5 and 60 $m^2$/% Pt g. The given range of the ratio SA/% Pt enhances the catalytic activity with regard to carbon monoxide and formaldehyde in closed loop, life support systems, as will be described in additional detail below. In further embodiments, the ratio SA/% Pt is between 10 and 30 $m^2$/% Pt g, between 20 and 30 $m^2$/% Pt g or nominally is approximately 15 $m^2$/% Pt g, for a desirable balance between catalytic performance and cost, for instance.

The titania support particles 22 may also define an average pore volume, PV, which can be expressed in the units of cubic centimeters per gram ($cm^3$/g). In addition to or independent of the above ratio of SA/% Pt, the catalyst 20 may have a predetermined ratio of % Pt/PV. In embodiments, the ratio % Pt/PV is between 7.5 and 100% Pt g/$cm^3$, to enhance the catalytic activity of the catalyst 20 in closed loop, life support systems. In further embodiments, the ratio % Pt/PV is between 10 and 75% Pt g/$cm^3$, between 12.5 and 33.3% Pt g/$cm^3$ or nominally is between 16.67 and 25% Pt g/$cm^3$, for a desired balance between catalytic activity and cost, for instance.

In embodiments, the % Pt may be 3-30 wt % and the nominal SA of the titania support particles 22 may be approximately 150 $m^2$/g. In further embodiments, the SA may broadly be between 100 and 300 $m^2$/g. The PV may be 0.3-0.4 $cm^3$/g.

A method for processing the catalyst 20 includes depositing the platinum metal 28 on the titania support particles 22 with the given predetermined ratio of SA/% Pt and/or ratio of % Pt/PV. In one example, an insipient wetness technique may be used to deposit the platinum metal 28 on the titania support particles 22. The insipient wetness technique generally includes mixing the titania support particles 22 with a solution that includes chloroplatinic acid, drying the mixture to leave a residual platinum salt on the titania support particles 22 and then reducing the platinum salt to the platinum metal 28. The reduction step may be conducted in a reducing environment, such as an environment containing hydrogen gas, although other techniques for reduction are also possible. The amount of the platinum metal 28 that is ultimately deposited is controlled by controlling the concentration of the chloroplatinic acid in the solution. An appropriate concentration of chloroplatinic acid for a given desired loading of the platinum metal 28 can be easily determined through experimentation.

Figure 2:
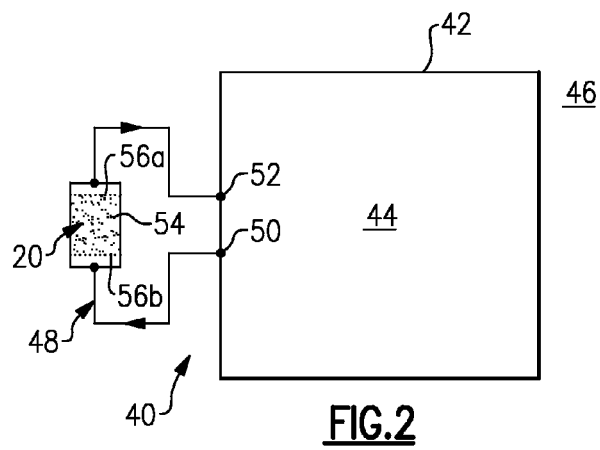
FIG. 2 illustrates an example life support system.

FIG. 2 illustrates an example life support system 40 that employs the catalyst 20 as described herein. The life support system 40 may be located within a space vehicle, space station, or a self-contained terrestrial unit that is closed to the surrounding environment. In general, the life support system 40 interfaces with and may include a compartment 42 that encloses an internal environment 44 from an environment 46 outside of the compartment 42 with regard to any gas circulation between the internal environment 44 and the surrounding environment 46 (i.e., a closed-loop system).

In the example of FIG. 2, the life support system 40 includes an air conditioning passage 48 that is connected with the internal environment 44 at an inlet 50 to receive air therefrom. The air conditioning passage 48 is also connected with the internal environment 44 at an outlet 52 to discharge conditioned air back into the internal environment 44. The air conditioning passage 48 may also include additional components, such as valves, fans, filters, etc. (not shown). The catalyst 20 as described herein is disposed within the air conditioning passage 48 to condition the air that is received from the internal environment 44.

In the illustrated example, the catalyst 20 is packed in a bed 54 between screens 56a and 56b. The catalyst 20 receives air to be conditioned from the inlet 50, treats the air as it passes through the bed 54 (e.g., to remove carbon monoxide and/or formaldehyde), and discharges conditioned air through the outlet 52 back into the internal environment 44 of the compartment 42.

As indicated above with regard to FIG. 1, the catalyst 20 includes a predetermined ratio of SA/% Pt and/or % Pt/PV that enhance catalytic activity in the life support system 40. In closed-loop systems where air is recirculated and there is substantially no circulation with the surrounding environment 46 (or ability for circulation if in outer space), it is desirable to remove substantially all of the target substances from the air that passes through the catalyst 20 in a single pass to sustain a suitable human living environment, for example. Especially in a threat situation where there is smoke from a fire threat or a post-fire scenario, it is desirable to revitalize the air of the internal environment 44 in a rapid manner to sustain or return to a suitable human living environment. The disclosed catalyst 20 exhibits enhanced catalytic activity for single pass target substance removal in comparison with other catalysts of lower platinum loading, different catalytic metal or different kind of support particles. The disclosed catalyst 20 thereby has the ability to treat higher levels of carbon monoxide at a greater space velocity (1/hr) than the other catalysts and is thereby desirable for use in the closed-loop life support system 40.

Figure 3:
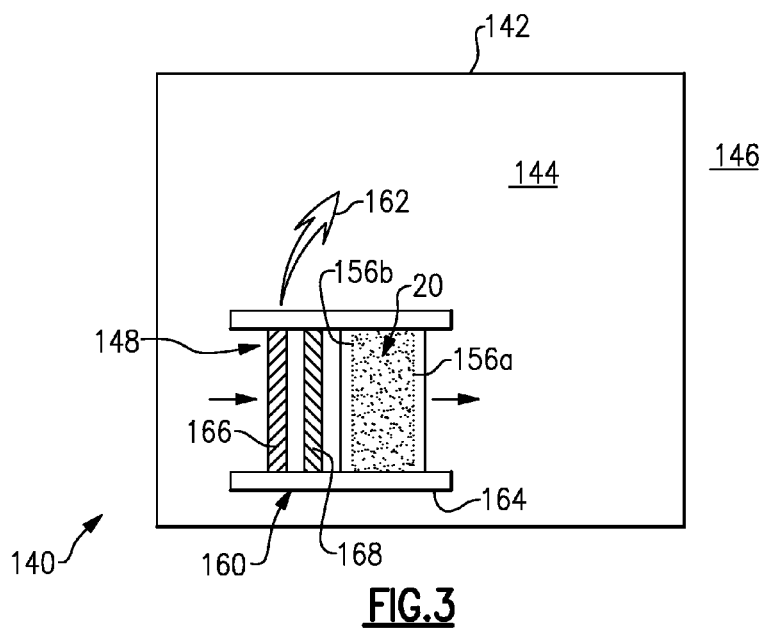
FIG. 3 illustrates another example life support system.

FIG. 3 illustrates another example life support system 140 that also employs the catalyst 20 as described herein. In this example, the catalyst 20 and air conditioning passage 148 are employed within a portable unit 160 that can be freely moved within the compartment 142, as generally indicated by arrow 162. In one example, the portable unit 160 may have a size of approximately 13 inches in diameter by 30 inches in length (approximately 30 by 76.2 centimeters), such that a user can relatively easily carry the portable unit 160 between locations in the compartment 142. It is to be understood that the size is not necessarily limited to the given example.

As illustrated, the portable unit 160 includes a housing 164 that generally defines the air conditioning passage 148. A fan 166 may be arranged within the housing 164 to draw air into the air conditioning passage 148 from the internal environment 144. Similar to the example of FIG. 2, the internal environment 144 of the compartment 142 is closed from an outside environment 146 with regard to any gas circulation between the environments. Optionally, the portable unit 160 also includes a filter 168 to remove particles from the air before the air enters the catalyst 20. Alternatively, or in addition to the filter 168, another filter (not shown) may be arranged downstream from the catalyst 20.

Thus, the portable unit 160 is a self-contained unit that may be stowed when not in use and then brought out of storage if a need arises. As an example, in the case of a fire threat or post-fire scenario there may be elevated amounts of carbon monoxide and/or formaldehyde. A user may employ the portable unit 160 to facilitate lowering the carbon monoxide and/or formaldehyde levels.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A life support system comprising:
 a compartment within a space vehicle, space station, or a self-contained terrestrial unit that encloses an internal environment from an environment outside of the compartment with regard to any gas circulation between the internal environment and the surrounding environment;
 an air conditioning passage in fluid communication with the internal environment receiving air therefrom and discharging conditioned air thereto; and
 a catalyst disposed within the air conditioning passage to condition the air received from the internal environment, the catalyst including a plurality of titania support particles defining an average particle surface area, SA, wherein SA is 100-300 $m^2/g$, and platinum metal disposed on the plurality of titania support particles in an amount, % Pt of 3-30 wt %, wherein the % Pt is a percentage of a combined weight of the platinum metal and the plurality of titania support particles, such that a ratio of SA/% Pt is between 5 and 50 $m^2/\%$ Pt g.

2. The life support system as recited in claim 1, wherein the air conditioning passage and the catalyst are within a portable unit that can be freely moved within the compartment.

3. The life support system as recited in claim 1, wherein the catalyst is packed in a bed between screens.

4. The life support system as recited in claim 1, wherein the ratio SA/% Pt is between 10 and 30 $m^2/\%$ Pt g.

5. The life support system as recited in claim 1, wherein the plurality of titania support particles define a pore volume, PV, such that a ratio of % Pt/PV is between 7.5 and 100% Pt $g/cm^3$.

6. The life support system as recited in claim 5, wherein the ratio % Pt/PV is between 10 and 75% Pt $g/cm^3$.

7. The life support system as recited in claim 5, wherein the ratio % Pt/PV is between 12.5 and 33.3% Pt g/cm$^3$.

8. The life support system as recited in claim 5, wherein the ratio % Pt/PV is between 16.67 and 25% Pt g/cm$^3$.

9. The life support system as recited in claim 1, wherein the SA is approximately 150 m$^2$/g.

10. The life support system as recited in claim 1, wherein the % Pt is 5-15 wt %.

11. The life support system as recited in claim 1, wherein the plurality of titania support particles define an average pore volume, PV, that is 0.3-0.4 cm$^3$/g.

12. The life support system as recited in claim 1, wherein the catalyst is immobilized in a bed between screens.

13. The life support system as recited in claim 12, further comprising a housing defining the air conditioning passage, and a fan arranged in the housing.

14. The life support system as recited in claim 13, further comprising a filter in the housing.

15. A life support system for a compartment comprising:
   an air conditioning passage within a space vehicle, space station, or a self-contained terrestrial unit for flowing air into and out of the compartment; and
   a catalyst disposed within the air conditioning passage, the catalyst consisting essentially of titania support particles coated with platinum, wherein each titania support particle has an average particle surface area, SA, and an average weight percent platinum, % Pt, such that a ratio of SA/% Pt is between about 5 and 50 m$^2$/% Pt g, and wherein the titania support particles define a pore volume, PV, such that a ratio of % Pt/PV is between 7.5 and 100% Pt g/cm$^3$.

16. The life support system as recited in claim 15, wherein the compartment is a closed-loop system with respect to any gas circulation between an internal environment in the compartment and an environment surrounding the compartment.

17. The life support system as recited in claim 15, wherein the compartment is within a space vehicle, space station, or a self-contained terrestrial unit, that is closed to the surrounding environment.

18. The life support system as recited in claim 15, wherein the ratio SA/% Pt is between 10 and 30 m$^2$/% Pt g.

* * * * *